(12) United States Patent
Yasuda et al.

(10) Patent No.: US 12,429,020 B2
(45) Date of Patent: Sep. 30, 2025

(54) TWO-STROKE ENGINE WITH CRANKCASE FUEL INJECTOR

(71) Applicant: MARUYAMA MFG. CO., INC., Tokyo (JP)

(72) Inventors: Terutaka Yasuda, Tokyo (JP); Ryota Matsuzawa, Tokyo (JP)

(*) Notice: Subject to any disclaimer, the term of this patent is extended or adjusted under 35 U.S.C. 154(b) by 0 days.

(21) Appl. No.: 18/822,492

(22) Filed: Sep. 3, 2024

(65) Prior Publication Data

US 2024/0426266 A1 Dec. 26, 2024

Related U.S. Application Data

(63) Continuation of application No. PCT/JP2023/007374, filed on Feb. 28, 2023.

(30) Foreign Application Priority Data

Mar. 18, 2022 (JP) ................. 2022-043649

(51) Int. Cl.
 *F02M 61/14* (2006.01)
 *F02B 25/14* (2006.01)
 *F02B 75/02* (2006.01)

(52) U.S. Cl.
 CPC ............ *F02M 61/14* (2013.01); *F02B 25/14* (2013.01); *F02B 75/02* (2013.01); *F02B 2075/025* (2013.01); *F02B 2710/036* (2013.01)

(58) Field of Classification Search
 CPC .... F02B 2075/025; F02B 25/14; F02B 75/02; F02M 61/14
 See application file for complete search history.

(56) References Cited

U.S. PATENT DOCUMENTS

| 4,967,712 A | * | 11/1990 | Chasteen | ................ F02D 41/26 |
| | | | | 236/DIG. 8 |
| 2005/0139179 A1 | * | 6/2005 | Mavinahally | ............. F02D 9/16 |
| | | | | 123/73 A |
| 2013/0146028 A1 | | 6/2013 | Layher et al. | |
| 2016/0258384 A1 | | 9/2016 | Yasuda | |
| 2021/0254544 A1 | * | 8/2021 | Koehli | .................... F02B 25/00 |

FOREIGN PATENT DOCUMENTS

| EP | 4116552 | 1/2023 |
| JP | S61-164029 | 7/1986 |
| JP | H7-224741 | 8/1995 |

(Continued)

OTHER PUBLICATIONS

International Search Report dated May 16, 2023 for PCT/JP2023/007374.

(Continued)

*Primary Examiner* — Kevin A Lathers
(74) *Attorney, Agent, or Firm* — SOEI PATENT & LAW FIRM

(57) ABSTRACT

A two-stroke engine includes a cylinder having an intake port, a piston configured to open and close the intake port by reciprocating in the cylinder, a crankcase connected to the cylinder and including a crank chamber, a crank assembly located in the crank chamber, a connecting rod having a first end connected to the piston and a second end connected to the crank assembly, and a fuel injector attached to the crankcase and configured to inject mixed fuel to the second end.

14 Claims, 7 Drawing Sheets

(56) References Cited

FOREIGN PATENT DOCUMENTS

| | | | | |
|---|---|---|---|---|
| JP | 2789443 | 8/1998 | | |
| JP | 2000-283008 | 10/2000 | | |
| JP | 2013-119861 | 6/2013 | | |
| JP | 2016-160835 | 9/2016 | | |
| WO | WO-2007133125 A1 * | 11/2007 | ........... | F02D 31/007 |
| WO | 2021/177010 | 9/2021 | | |
| WO | WO-2021177010 A1 * | 9/2021 | .............. | F02B 17/00 |

OTHER PUBLICATIONS

International Preliminary Report on Patentability with Written Opinion dated Oct. 3, 2024 for PCT/JP2023/007374.

\* cited by examiner

TWO-STROKE ENGINE WITH CRANKCASE FUEL INJECTOR

CROSS-REFERENCE TO RELATED APPLICATIONS

This application is a continuation application of PCT Application No. PCT/JP2023/007374, filed on Feb. 28, 2023, which claims the benefit of priority from Japanese Patent Application No. 2022-043649, filed on Mar. 18, 2022. The entire contents of the above listed PCT and priority applications are incorporated herein by reference.

BACKGROUND

Field

The present disclosure relates to a two-stroke engine of a piston valve type.

Description of the Related Art

Japanese Unexamined Patent Application Publication No. H7-224741 discloses a fuel injection two-stroke engine in which a main scavenging passage and an auxiliary scavenging passage are formed in a cylinder block is known. In this two-stroke engine, a fuel injection device is attached to a crankcase. The fuel injection device is directed to inject fuel toward a scavenging inlet of the auxiliary scavenging passage. As a fuel injection method, a method of injecting fuel into an intake path to a crank chamber, a method of directly injecting fuel into a combustion chamber, and the like are known.

SUMMARY

Disclosed herein is an example two-stroke engine of a piston valve type in which an intake port is opened and closed by a piston configured to reciprocate in a bore portion of a cylinder along an axial direction. The engine includes a crankcase connected to the cylinder and having a crank chamber, a crank mechanism located in the crank chamber and configured to rotate about a crankshaft, a connecting rod having a small end connected to the piston and a large end connected to the crank mechanism, and a fuel injector attached to the crankcase and configured to inject mixed fuel in a tangential direction of a circumferential trajectory of the large end to spray the mixed fuel to the large end.

In this two-stroke engine, the fuel injector attached to the crankcase sprays the mixed fuel to the large end of the connecting rod. At this time, the fuel injector injects the mixed fuel in a tangential direction of a circumferential trajectory of the large end. The large end is lubricated and cooled by the oil contained in the mixed fuel. The fuel (gasoline or the like) contained in the mixed fuel also cools the large end. Accordingly, it may perform lubrication and cooling in the large end with a small amount of mixed fuel. In addition, since the mixed fuel is injected not into the combustion chamber or the bore portion but into the crankcase, it may not be necessary to consider pressure resistance and heat resistance with respect to a peripheral configuration of the fuel injector.

In some examples, the injection port of the fuel injector may protrude into the crank chamber. With this configuration, since the mixed fuel can be injected from a position closer to the large end, the above-described desired lubricating effect and cooling effect can be readily obtained.

In some examples, the crank mechanism may include a pair of crank webs connected to the crankshaft and separated from each other in an axial direction of the crankshaft, and the injection port of the fuel injector may be located at a position passing through a gap between the pair of crank webs. With this configuration, the injection port can be brought closer to the large end, and the large end can be cooled.

In some examples, the fuel injector may be configured to inject the mixed fuel to the large end at least when the piston is located at a top dead center. With this configuration, the fuel injection matches the scavenging timing, and it may introduce the fuel sprayed to the large end into a scavenging hole.

In some examples, a scavenging hole is formed in the cylinder, and an inlet of the scavenging hole opening toward the crank chamber may be located at the same height as the injection port of the fuel injector in the axial direction. With this configuration, the fuel sprayed to the large end is readily introduced into the scavenging hole. Since the mixed fuel stays in the vicinity of the inlet of the scavenging hole, the fuel is readily introduced into the scavenging hole. Accordingly, it may reduce unnecessary fuel that is not introduced into the scavenging hole (14), and it may obtain an effect of reducing fuel consumption. Furthermore, transient responsiveness and startability may be improved.

Additionally, an example two-stroke engine includes a cylinder including an intake port, a piston configured to open and close the intake port by reciprocating in the cylinder, a crankcase connected to the cylinder and including a crank chamber, a crank assembly located in the crank chamber, a connecting rod including a first end connected to the piston and a second end connected to the crank assembly, and a fuel injector attached to the crankcase and configured to inject mixed fuel to the second end.

DETAILED DESCRIPTION

In the following description, with reference to the drawings, the same reference numbers are assigned to the same components or to similar components having the same function, and overlapping description is omitted.

In the following description, the term "up and down" is based on a case where a cylinder body 2a is erected so that a bore portion 3 of a cylinder 2 extends in the vertical direction with the opening portion into which a piston 4 is inserted facing downward. "Upper" corresponds to one side in an axis L direction of the bore portion 3, and "lower" corresponds to a lower side in the axis L direction.

Figure 1:
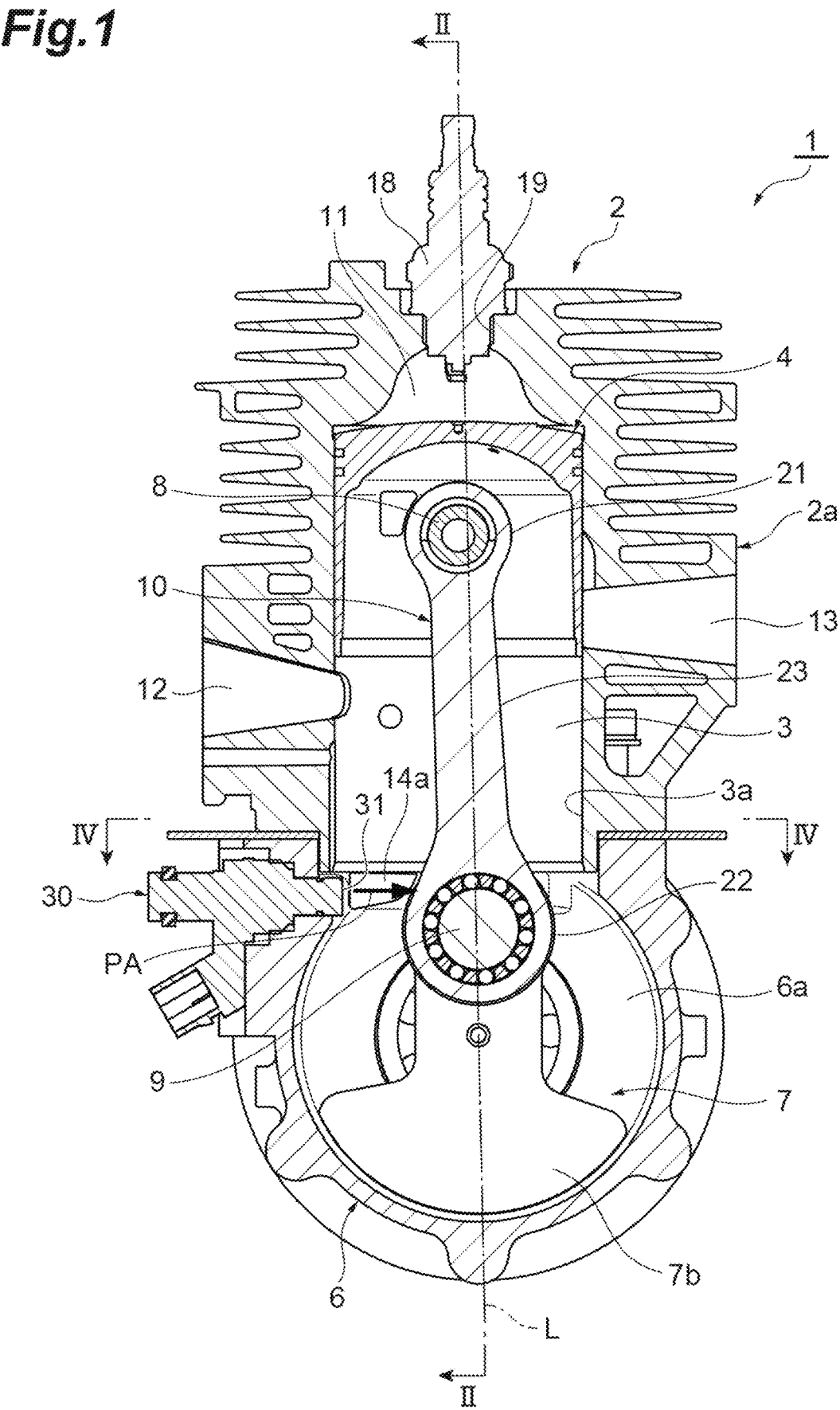
FIG. 1 is a longitudinal sectional view of an example two-stroke engine.
Figure 2:
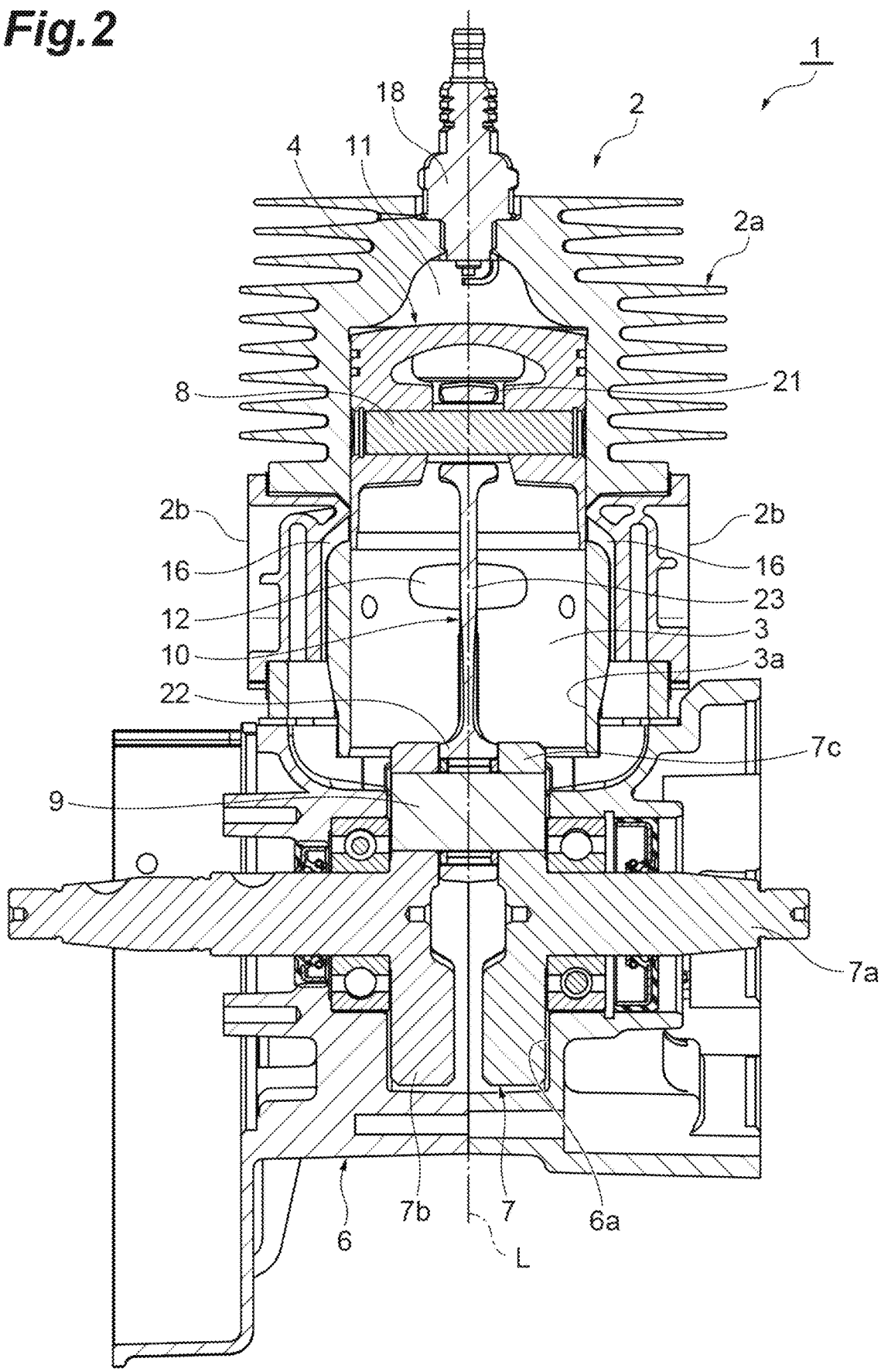
FIG. 2 is a cross-sectional view taken along line II-II of FIG. 1.
Figure 3:
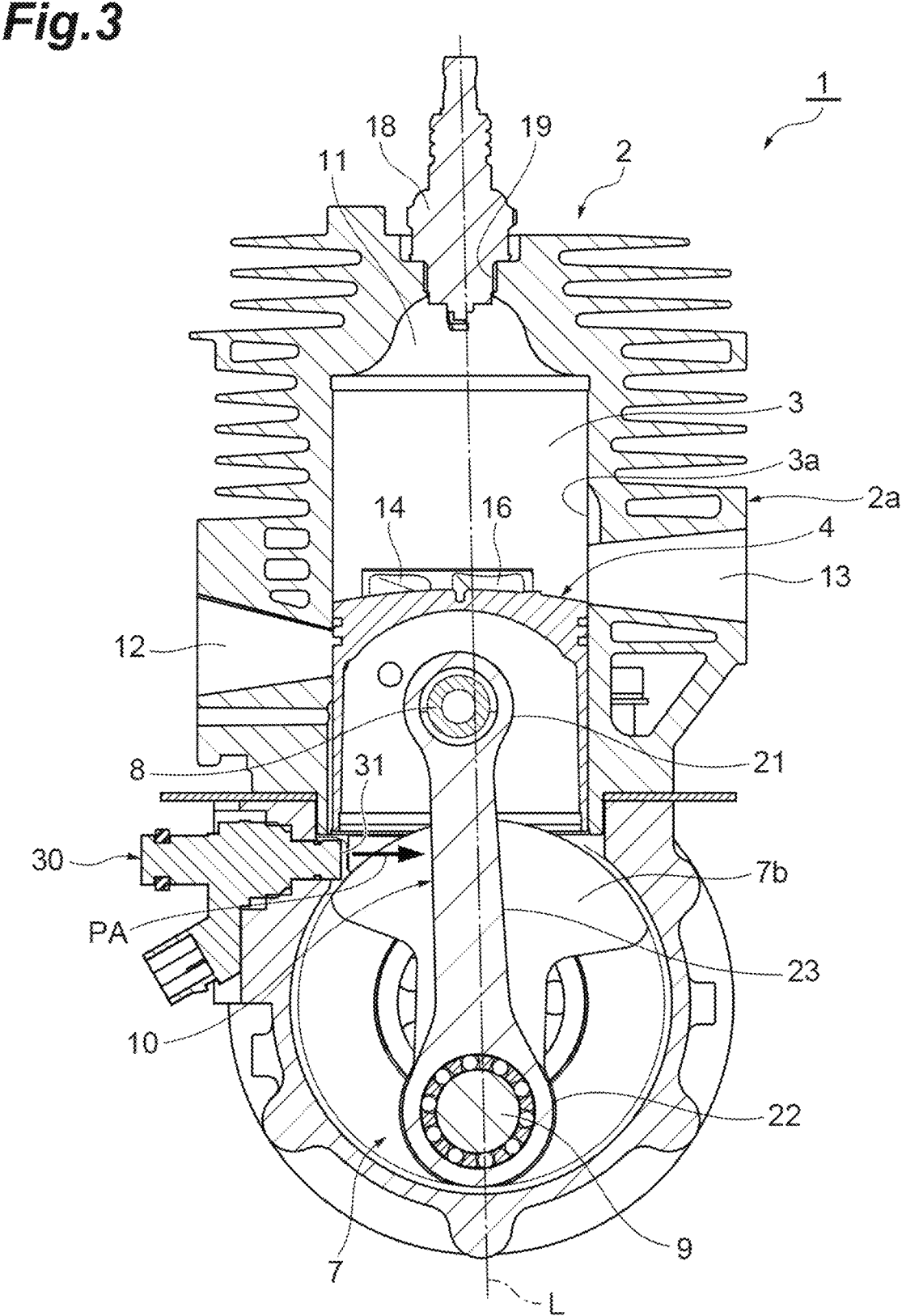
FIG. 3 is a longitudinal sectional view illustrating a state in which a piston is located at a bottom dead center.

As illustrated in FIGS. 1, 2, and 3, an engine 1 is a two-stroke engine employing a Schnuerle method as a scavenging method, and is mounted on, for example, a brush cutter, a knapsack-type power sprayer, or the like. The engine 1 includes the cylinder 2, the piston 4 that reciprocates in the bore portion 3 in the cylinder 2, a crankcase 6 connected below the cylinder 2 and having a crank chamber 6a, and a crank mechanism 7 disposed in the crank chamber 6a of the crankcase 6. A piston pin 8 provided in the piston 4 and a crank pin 9 of the crank mechanism 7 provided in the crankcase 6 are connected by a connecting rod 10. The piston 4 is disposed in the bore portion 3 and can reciprocate along the axis L direction between a combustion chamber 11 and the crank chamber 6a. In the following description, the connecting rod 10 is referred to as a con-rod 10.

The cylinder 2 is formed with the combustion chamber 11, a cylindrical bore portion 3 connected to the combustion chamber 11 and into which the piston 4 is inserted, an intake port 12 and an exhaust port 13 communicating with the bore portion 3, and a pair of intake side scavenging holes 14 and a pair of exhaust side scavenging holes 16. The cylinder 2 includes a cylinder body 2a and a pair of scavenging cassettes 2b fitted into a lower portion of the cylinder body 2a. The pair of scavenging cassettes 2b is fitted and fixed in two openings formed to face each other in the radial direction of the bore portion 3. The pair of intake side scavenging holes 14 and the pair of exhaust side scavenging holes 16 are formed by, for example, the cylinder body 2a and the pair of scavenging cassettes 2b (see FIG. 2).

The bore portion 3 has a cylindrical bore surface 3a and extends in the axis L direction in the cylinder 2. A bottom dead center side (lower side in the drawing) of the bore portion 3 is opened and communicates with the crank chamber 6a. A combustion chamber 11 having a recessed shape is formed at an end of the bore portion 3 on the top dead center side, and a discharge electrode such as an ignition plug 18 is disposed inside the combustion chamber 11. An ignition plug attachment hole 19 to which the ignition plug 18 is attached is provided near the combustion chamber 11 of the cylinder body 2a.

The intake port 12 and the exhaust port 13 each communicate with the bore portion 3, and the exhaust port 13 is disposed slightly closer to the top dead center than the intake port 12 in the axis L direction. The intake port 12 and the exhaust port 13 are disposed to be shifted from each other by approximately 180° in a circumferential direction of the bore portion 3 so as to face each other in the radial direction of the bore portion 3.

The intake side scavenging holes 14 are for introducing fresh air gas containing fuel into the bore portion 3 and the combustion chamber 11 in the scavenging process, and extend along the axis L direction inside the side wall of the cylinder 2. The fresh air gas is an air-fuel mixture for engine operation in which a mixed fuel including gasoline and oil and air are mixed. Ends of the intake side scavenging holes 14 on the top dead center side each communicate with the bore portion 3 at a position substantially similar to that of the exhaust port 13 in the axis L direction. The intake side scavenging holes 14 are disposed apart from each other in the circumferential direction of the bore portion 3. The intake side scavenging holes 14 may be disposed substantially line-symmetrically with respect to an imaginary line connecting the intake port 12 and the exhaust port 13 in the radial direction. The intake side scavenging holes 14 are provided so that fresh air gas introduced into the bore portion 3 is directed toward the intake port 12.

An end (inlet 14a to be described later) of the intake side scavenging hole 14 on the bottom dead center side communicates with the crank chamber 6a. An end of the exhaust side scavenging hole 16 on the bottom dead center side communicates with the crank chamber 6a described above.

The exhaust side scavenging holes 16 are for introducing exhaust gas recirculation (EGR) gas, which is an exhaust gas after combustion having a lower fuel content than the working gas, into the bore portion 3 and the combustion chamber 11 in the scavenging process, and extend along the axis L direction inside the side wall of the cylinder 2. Ends of the exhaust side scavenging holes 16 on the top dead center side each communicate with the bore portion 3 at a position substantially similar to that of the exhaust port 13 in the axis L direction. The exhaust side scavenging holes 16 are disposed apart from each other in the circumferential direction of the bore portion 3. The exhaust side scavenging holes 16 may be disposed substantially line-symmetrically with respect to the imaginary line connecting the intake port 12 and the exhaust port 13 in the radial direction. The exhaust side scavenging holes 16 are provided so that the EGR gas introduced into the bore portion 3 is directed toward the intake port 12. For example, the piston 4 may be provided with a communication passage that allows the exhaust port 13 and the exhaust side scavenging holes 16 to communicate with each other when the piston 4 is near the top dead center, and allows the exhaust gas after combustion to be taken into the exhaust side scavenging holes 16 from the exhaust port 13 as the EGR gas.

As described above, the engine 1 is a two-stroke engine of a piston valve type in which the intake port 12 is opened and closed by the piston 4 reciprocating in the bore portion 3. In the engine 1, among the components constituting the fresh air gas, air is introduced from the intake port 12, and the mixed fuel containing gasoline and oil is injected into the crank chamber 6a for cooling the large end 22 of the con-rod 10. Thus, the air and the mixed fuel are mixed in the crank chamber 6a of the crankcase 6 to generate the air-fuel mixture.

Figure 5A:
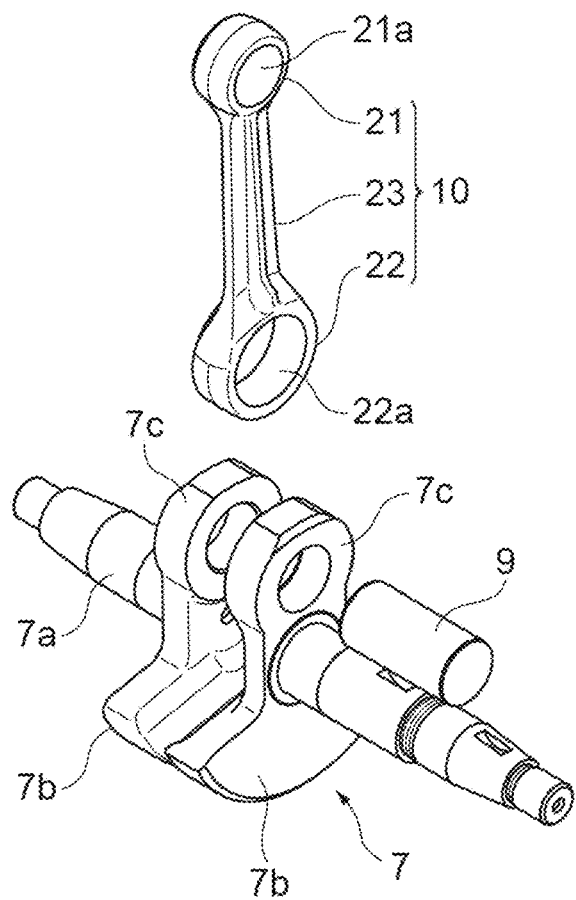
FIG. 5A is an exploded perspective view illustrating a crank mechanism and a connecting rod.

Configurations of the crank mechanism 7 and the con-rod 10 will be described with reference to FIGS. 5A and 5B. As illustrated in FIG. 5A, the crank mechanism 7 includes a crankshaft 7a, a pair of crank webs 7b connected to the crankshaft 7a, and a pair of connecting portions 7c provided on the opposite side of the crank web 7b in the radial direction. The connecting rod 10 includes a first end (e.g., small end 21) rotatably connected to the piston 4 via the piston pin 8 by inserting the piston pin 8 into the pin insertion hole 21a, a second end (e.g., large end 22) rotatably connected to the connecting portion 7c of the crank mechanism 7 via the crank pin 9 by inserting the crank pin 9 into the pin insertion hole 22a, and a rod main body 23 connecting the small end 21 and the large end 22. The large end 22 is larger than the small end 21.

The crank web 7b, the connecting portion 7c, and the crankshaft 7a are integrally molded. The crank pin 9 inserted through the pair of connecting portions 7c is joined and fixed to these connecting portions 7c, and the entire crank mechanism 7 forms a rigid body. The pair of crank webs 7b has a fan shape centered on the crankshaft 7a, and is guided by a cylindrical wall surface of the crank chamber 6a to rotate around the crankshaft 7a. When the con-rod 10 moves up and down along with the reciprocating motion of the piston 4, the large end 22 of the con-rod 10 moves (rotates) along a circumferential track together with the crank pin 9 and the connecting portion 7c, and the reciprocating motion of the piston 4 is converted into a rotational motion of the crankshaft 7a.

Figure 5B:
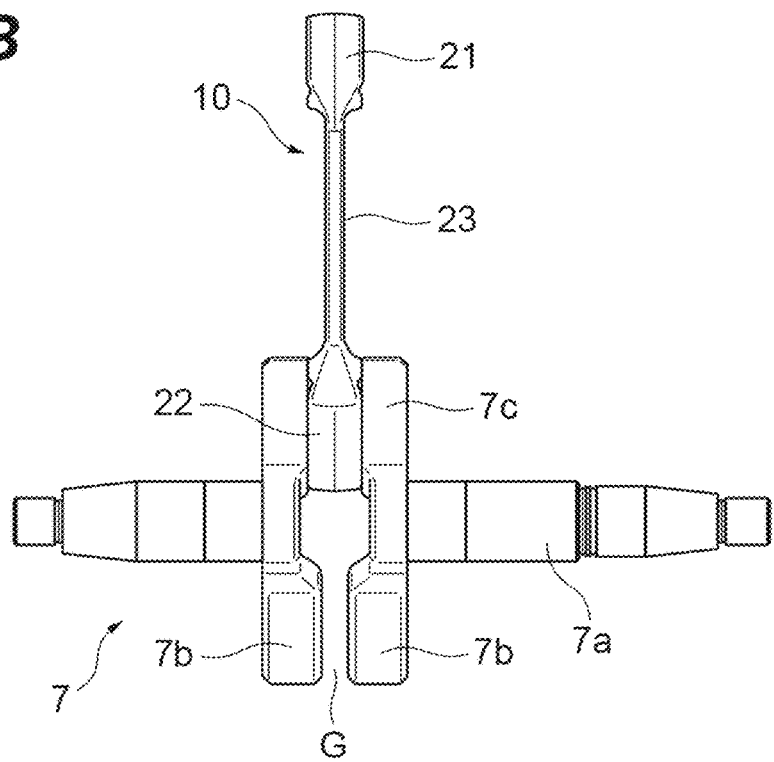
FIG. 5B is a side view illustrating the crank mechanism and the connecting rod.

As illustrated in FIG. 5B, the pair of crank webs 7b (e.g., rotating crank webs) extends parallel to each other and is separated from each other in the axial direction of the crankshaft 7a. A gap G is formed between the pair of crank webs 7b. During the rotation of the crank mechanism 7, the large end 22 of the con-rod 10 and the gap G between the crank webs 7b are always located on the opposite side in the radial direction. The circumferential trajectory (e.g., circular trajectory) of the large end 22 and the circumferential trajectory (e.g., circular trajectory) of the gap G overlap.

As illustrated in FIG. 1, the engine 1 includes a fuel injector (e.g., injection nozzle 30) that sprays the mixed fuel toward the large end 22 of the con-rod 10. The fuel injection nozzle 30 is attached to an upper portion of the crankcase 6 and near a connection position with the cylinder body 2a. A tip portion of the fuel injection nozzle 30 including the injection port 31 through which the mixed fuel is injected is fitted from the outside to the inside of the crankcase 6. The injection port 31 of the fuel injection nozzle 30 is directed, for example, in a direction intersecting both the axis L direction of the bore portion 3 and the axial direction of the crankshaft 7a. The injection port 31 of the fuel injection nozzle 30 may be oriented in a direction orthogonal to both the axis L direction of the bore portion 3 and the axial direction of the crankshaft 7a. The fuel injection nozzle 30 sprays at least a portion of the mixed fuel in a fuel path PA. The fuel path PA is tangential to the circumferential trajectory of the large end 22.

Figure 4:
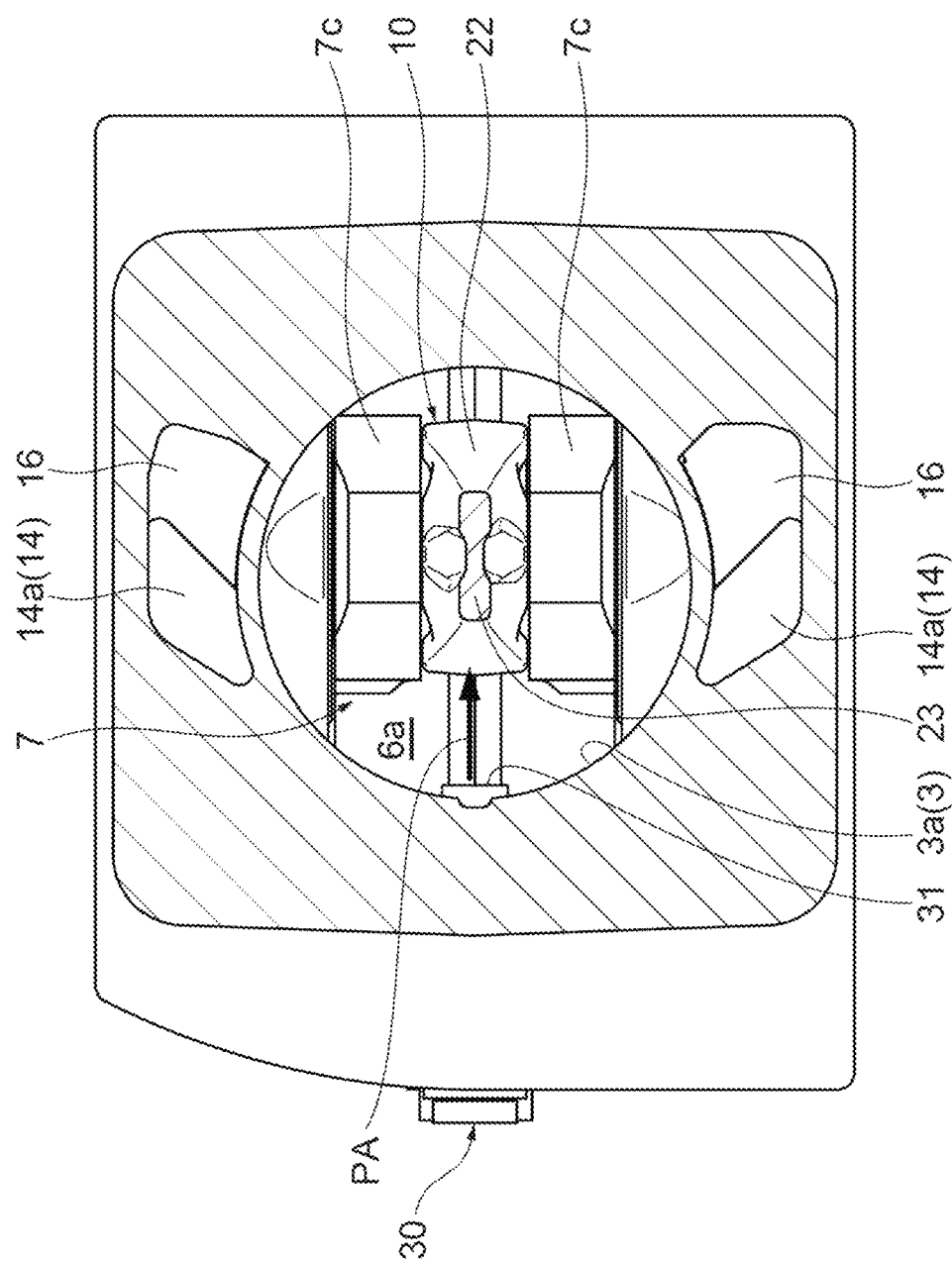
FIG. 4 is a cross-sectional view taken along line IV-IV of FIG. 1.

FIG. 4 is a cross-sectional view taken along line IV-IV of FIG. 1. As illustrated in FIG. 4, the fuel injection nozzle 30 is disposed in a diametrical direction of the bore portion 3 (bore surface 3a) in plan view. The injection port 31 of the fuel injection nozzle 30 slightly protrudes into the crank chamber 6a. The injection port 31 is disposed at a position passing through the gap G (see FIG. 5B) between the pair of crank webs 7b during the rotation of the crank mechanism 7. Since the injection port 31 faces (faces) the gap G in this manner, there is a positional relationship in which no other member exists between the injection port 31 and the pin insertion hole 22a.

Furthermore, as illustrated in FIGS. 1 and 4, inlets 14a of the pair of intake side scavenging holes 14 are located in the vicinity of the side of the injection port 31. The pair of inlets 14a opens toward the crank chamber 6a. The pair of inlets 14a also communicates with the pair of exhaust side scavenging holes 16. The distance along the circumferential direction between the injection port 31 and the inlet 14a is shorter than ¼ of the length of the peripheral surface of the bore surface 3a (the inner peripheral surface of the bore portion 3). That is, the injection port 31 and the one intake side scavenging hole 14 are disposed within a range of 90° as a central angle with respect to the axis L of the bore portion 3. The injection port 31 and the other intake side scavenging hole 14 are disposed within a range of 90° as a central angle with respect to the axis L of the bore portion 3. The inlet 14a of the intake side scavenging hole 14 is located at the same height as the injection port 31 of the fuel injection nozzle 30 in the direction of the axis L. The injection port 31 of the fuel injection nozzle 30 may be located at the height position of the upper end of the crankcase 6.

Figure 7A:
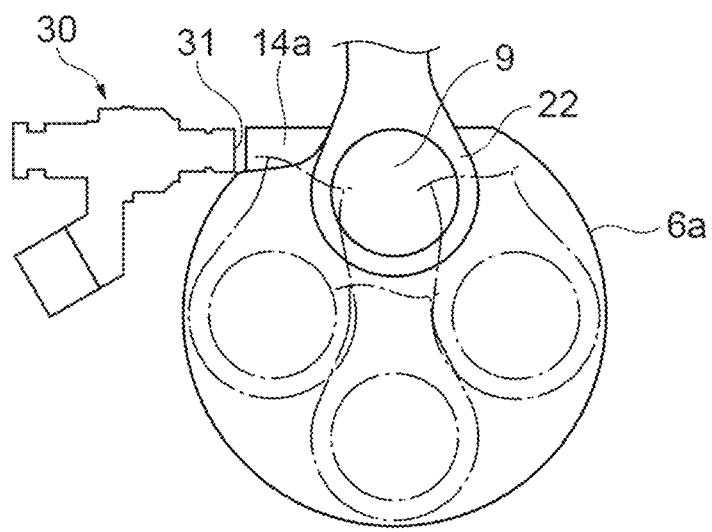
FIG. 7A is a diagram illustrating an injection timing of a mixed fuel in the two-stroke engine of FIG. 1.

As illustrated in FIGS. 1 and 7A, the fuel injection nozzle 30 injects the mixed fuel in a tangential direction of the circumferential track of the large end 22. The period during which the mixed fuel is injected from the fuel injection nozzle 30 includes at least when the piston 4 is located at the top dead center (at that time, the pin large end 22 is also located at the uppermost position). The injection of the mixed fuel from the fuel injection nozzle 30 may be continued, for example, up to a point of time 30° after the top dead center. The period during which the mixed fuel may be injected from the fuel injection nozzle 30 may start when the piston 4 is located at the top dead center (at 0°) or slightly before the top dead center (about several° to 15°) and end at the time point of 30° after the top dead center. The fuel injection nozzle 30 is configured to spray the mixed fuel to the large end 22 of the con-rod 10. The fuel injection nozzle 30 injects the mixed fuel while the large end 22 passes in front of the injection port 31.

Figure 6:
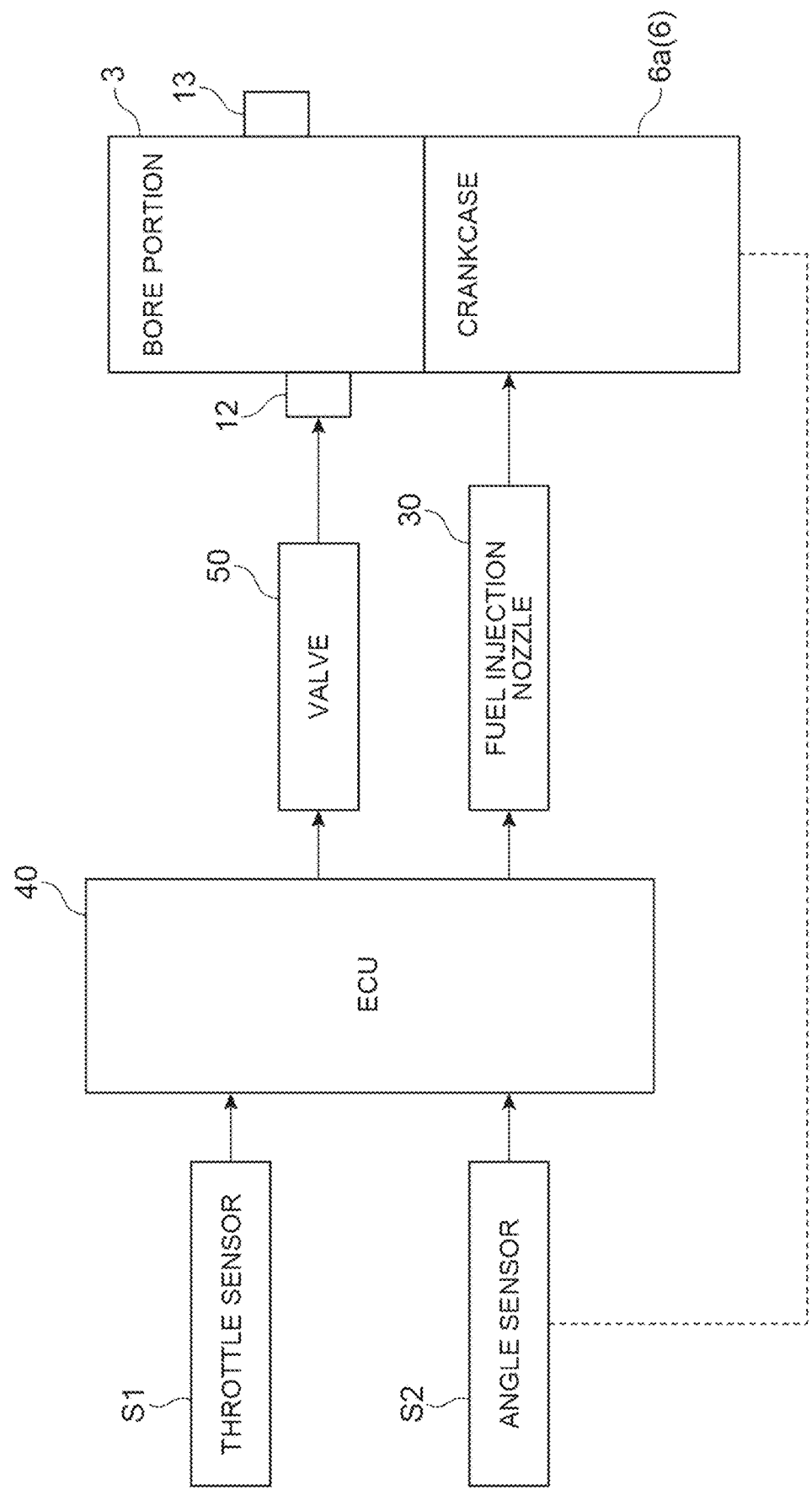
FIG. 6 is a block diagram illustrating a schematic configuration related to injection control of mixed fuel in a fuel injector.

The injection timing of the mixed fuel in the fuel injection nozzle 30 is controlled by the ECU 40 that controls the engine 1 as illustrated in FIG. 6. The ECU 40 controls the valve 50 and the fuel injection nozzle 30 that open and close the intake path to the intake port 12 on the basis of opening degree information of the throttle input from a throttle sensor S1 and rotation angle information of the crank mechanism 7 input from an angle sensor S2. The injection timing (injection period) described above can be adjusted by the ECU 40 based on the state of the engine 1. The fuel injection nozzle 30 is an injector for electronic control, and can adjust the injection amount of the mixed fuel. For example, even when the required mixed fuel (gasoline amount) is minimum, the ECU 40 injects the mixed fuel corresponding to a controllable limit value (minimum amount) from the fuel injection nozzle 30. In some examples, the fuel injection nozzle 30 is configured to spray the mixed fuel to the large end 22 at least when the piston 4 is located at the top dead center. Note that, in FIG. 6, the line (path) of the mixed fuel connected to the fuel injection nozzle 30 is omitted.

The mixed fuel injected from the injection port 31 forms a fuel path PA. The fuel path PA may be radial or linear. The nozzle can be selected and used from various shapes and types. An injection direction (central axis direction of injection) of the fuel injection nozzle 30 intersects the axis L and crosses the bore portion 3 in plan view. The central axis direction of the injection of the fuel injection nozzle 30 is, for example, orthogonal to the axis L. The central axis direction of the injection of the fuel injection nozzle 30 is also orthogonal to the axial direction of the crankshaft 7a, for example. The fuel path PA intermittently passes through the gap G formed between the pair of rotating crank webs 7b as the large end 22 moves in the circular trajectory.

Next, an operation in the engine 1 will be described. First, as the piston 4 rises from the bottom dead center toward the top dead center, the intake side scavenging hole 14, the exhaust side scavenging hole 16, and the exhaust port 13 are closed by the piston 4, and the fresh air gas in the combustion chamber 11 is compressed. As the piston 4 further rises, the intake port 12 communicates with the crank chamber 6a via the bore portion 3, and air is introduced into the crank chamber 6a (see FIGS. 1 and 2).

When the piston 4 reaches the vicinity of the top dead center, the air-fuel mixture explodes in the combustion chamber 11, and the piston 4 descends to the bottom dead center side. On the other hand, in the crank chamber 6a, when the piston 4 is located near the top dead center, the mixed fuel is injected from the fuel injection nozzle 30 under the control of the ECU 40. The mixed fuel is sprayed onto the large end 22 of the con-rod 10, thereby lubricating and cooling the large end 22. The injection of the mixed fuel is stopped immediately after the start of lowering of the piston 4 (at the latest by 30° after the top dead center). The air and the mixed fuel are mixed in the crank chamber 6a to generate fresh air gas.

As the piston 4 further descends, the exhaust port 13 is opened, and the combustion gas is exhausted (see FIG. 3). Then, slightly after the opening of the exhaust port 13, the intake side scavenging hole 14 and the exhaust side scavenging hole 16 are exposed to the inside of the bore portion 3, and the scavenging stroke is started. The injection of the mixed fuel is close to the timing of the start of the scavenging process. In addition, the distance from the injection port 31 to the inlet 14a of the intake side scavenging hole 14 is also short. The mixed fuel (fresh air gas) is reliably and readily introduced into the intake side scavenging hole 14. In the first half of the scavenging process, the exhaust side scavenging holes 16 are filled with EGR gas, and the intake side scavenging holes 14 are filled with fresh air gas.

When the intake side scavenging hole 14 opens in the bore portion 3, introduction of the fresh air gas from the intake side scavenging hole 14 into the bore portion 3 is started. As the piston 4 descends, the fresh air gas flows into the bore portion 3 from the intake side scavenging hole 14. At the same time, when the exhaust side scavenging hole 16 is opened, the EGR gas and the fresh air gas flow in this order from the exhaust side scavenging hole 16. Thus, layered scavenging is performed.

In the process in which the piston 4 reaches the bottom dead center, the pair of crank webs 7b of the crank mechanism 7 passes near the fuel injection nozzle 30, but since the injection port 31 passes through the gap G between the pair of crank webs 7b, they do not interfere.

In the engine 1 illustrated in FIG. 1, the fuel injection nozzle 30 attached to the crankcase 6 sprays the mixed fuel to the large end 22 of the con-rod 10. At this time, the fuel injection nozzle 30 injects the mixed fuel in the tangential direction of the circumferential track of the large end 22. Lubrication and cooling of the large end 22 are performed by the oil contained in the mixed fuel. The large end 22 is also cooled by gasoline contained in the mixed fuel. This enables lubrication and cooling of the large end 22 with a small amount of mixed fuel. In addition, since the mixed fuel is injected not into the combustion chamber 11 or the bore portion 3 but into the crankcase 6, it may not be required to consider pressure resistance and heat resistance with respect to a peripheral configuration of the fuel injection nozzle 30.

The injection port 31 of the fuel injection nozzle 30 protrudes into the crank chamber 6a. Accordingly, the mixed fuel can be injected from a position closer to the large end 22, and thus the desired lubricating effect and cooling effect described above can be readily obtained.

The injection port 31 of the fuel injection nozzle 30 is disposed at a position passing through the gap G between the pair of crank webs 7b. Thus, the injection port 31 can be brought closer to the large end 22, and the large end can be cooled.

The fuel injection nozzle 30 is configured to inject the mixed fuel into the large end 22 at least when the piston 4 is located at the top dead center. Thus, since the fuel injection matches the scavenging timing, it may introduce the fuel sprayed to the large end 22 into the intake side scavenging hole 14.

The inlet 14a of the intake side scavenging hole 14 is located at the same height as the injection port 31 of the fuel injection nozzle 30 in the direction of the axis L. Accordingly, the fuel sprayed to the large end 22 can be readily introduced into the intake side scavenging hole 14. Since the mixed fuel stays in the vicinity of the inlet 14a of the intake side scavenging hole 14, the fuel is readily introduced into the intake side scavenging hole 14. Accordingly, unnecessary fuel that is not introduced into the intake side scavenging hole 14 can be reduced, and an effect of reducing fuel consumption can also be obtained. Furthermore, transient responsiveness and startability may be improved.

Figure 7B:
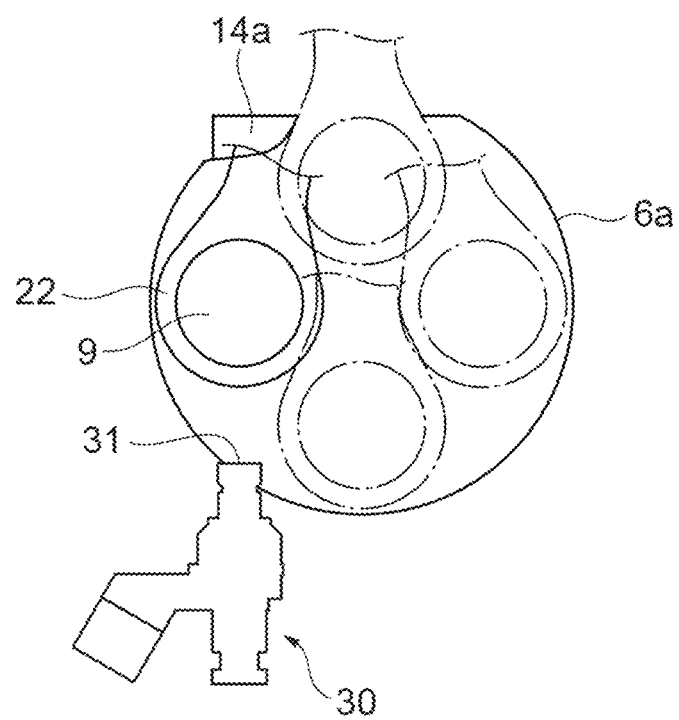
FIG. 7B is a diagram illustrating an injection timing of a mixed fuel in a two-stroke engine according to a modification.

In some examples, the fuel injection nozzle 30 may inject the mixed fuel to the large end 22 at least when the piston 4 is located at the top dead center. The fuel injection nozzle 30 illustrated in FIG. 7B may spray the mixed fuel to the large end 22 of the con-rod 10 on the way of the piston 4 toward the top dead center. The fuel injection nozzle 30 may be attached to, for example, a lower portion of the crankcase 6 in order to inject the mixed fuel in a tangential direction of a circumferential trajectory of the large end 22. The injection port 31 may be directed upward.

In some examples, the cylinder 2 may include a plurality of scavenging holes 14 configured to introduce an air-fuel mixture from the crankcase 6a into the combustion chamber 11. The plurality of scavenging ports 14 are located facing each other in a radial direction of the cylinder 2. In some examples, the cylinder 2 may have four scavenging holes, that is, the pair of intake side scavenging holes 14 and the pair of exhaust side scavenging holes 16. In some examples, a configuration may be employed in which the cylinder 2 is provided with one intake side scavenging hole 14 and one exhaust side scavenging hole 16. In some examples, the intake side scavenging holes 14 introduce the fresh air gas and the exhaust side scavenging holes 16 introduce the EGR gas. In some examples may be applicable to layered scavenging engines of the type using air. In some examples, only a pair of scavenging holes facing each other in the radial direction may be provided between the intake port 12 and the exhaust port 13. Only one scavenging hole may be provided in the cylinder 2.

Some examples based on the drawings are disclosed as follows.

An example two-stroke engine (1) of a piston valve type includes a cylinder (2) having a bore portion (3) and an intake port (14) fluidly coupled with the bore portion (3), a piston (4) located in the bore portion (3) and configured to open and close the intake port (14) by reciprocating along an axial direction of the cylinder (2), a crankcase (6) connected to the cylinder (2) and including a crank chamber (6a), a crank mechanism (7) located in the crank chamber (6a) and configured to rotate about a crankshaft (7a), a connecting rod having a first end (21) connected to the piston (4) and a second end (22) connected to the crank mechanism (7), and a fuel injector (30) attached to the crankcase and configured to inject mixed fuel toward the second end (22).

In some examples, the second end (22) is configured to move in a circular trajectory, and the fuel injector (30) includes an injection port (31) that is configured to spray at least a portion of the mixed fuel in a fuel path (PA) that is tangential to the circular trajectory of the second end (22).

In some examples, the injection port (31) protrudes into the crank chamber (6a).

In some examples, the crank mechanism (7) includes a pair of rotating crank webs (7b) connected to the crankshaft (7a) and separated from each other in an axial direction of the crankshaft (7a), and a portion of the injection port (31)

passes through a gap (G) formed between the pair of rotating crank webs (7b) as the second end (22) moves in the circular trajectory.

In some examples, the fuel injector (30) is configured to spray the mixed fuel toward the second end (22) at least when the piston (4) is located at a top dead center.

In some examples, wherein the cylinder (2) includes a scavenging hole (14) having an inlet (14a) opening toward the crank chamber (6a). The fuel injector (30) includes an injection port (31) that is configured to spray the mixed fuel toward the second end (22). The inlet (14a) is located at a same height as the injection port (31) of the fuel injector (30) in the axial direction.

Additionally, an example two-stroke engine (1) includes a cylinder (2) having an intake port (12), a piston (4) configured to open and close the intake port (14) by reciprocating in the cylinder (2), a crankcase (6) connected to the cylinder (2) and having a crank chamber (6a), a crank assembly (7) located in the crank chamber (6a), a connecting rod (10) having a first end (21) connected to the piston (4) and a second end (22) connected to the crank assembly (7), and a fuel injector (30) attached to the crankcase (6) and configured to spray mixed fuel toward the second end (22).

In some examples, the second end (22) is configured to move in a circular trajectory, and the fuel injector (30) comprises an injection port (31) that is configured to spray at least a portion of the mixed fuel in a fuel path that is tangential to the circular trajectory while the second end (22) moves in the circular trajectory.

In some examples, wherein the fuel injector (30) comprises an injection port (31) that is configured to spray the mixed fuel toward the second end (22), and wherein the injection port (31) is located adjacent to the cylinder (2).

In some examples, the second end (22) is configured to move in conjunction with a reciprocating motion of the piston (4), the fuel injector (30) comprises an injection port (31) that is configured to spray the mixed fuel in a fuel path directed toward the second end (22), and the injection port (31) faces the second end (22) when the piston (4) is located at a top dead center.

In some examples, the injection port (31) protrudes toward the second end (22) in the crank chamber (6a).

In some examples, the crank assembly (7) includes a crankshaft (7a), a first crank web (7b) connected to the crankshaft (7a) and configured to rotate around the crankshaft (7a), and a second crank web (7b) connected to the crankshaft (7a), located apart from the first crank web (7b), and configured to rotate around the crankshaft (7a), and the fuel path (PA) intermittently passes between the first crank web (7b) and the second crank web (7b) as the first crank web (7b) and the second crank web (7b) rotate around the crankshaft (7a).

In some examples, wherein the cylinder (2) includes a bore portion (3) in which the piston (4) reciprocates, a combustion chamber (11) fluidly coupling with the bore portion (3) and to which a discharge electrode (18) is attached, and a scavenging hole (14) configured to introduce an air-fuel mixture from the crankcase (6a) into the combustion chamber (11).

In some examples, the scavenging hole (14) includes an inlet (14a) directed toward the crank chamber (6a). The fuel injector (30) includes an injection port (31) configured to spray the mixed fuel toward the second end (22). The injection port (31) is located adjacent to the inlet (14a).

In some examples, the cylinder (2) includes an exhaust port (13) fluidly coupled with the bore portion (3) and configured to be opened and closed by a reciprocating motion of the piston (4). The scavenging hole (14) is located between the intake port (12) and the exhaust port (13) in a circumferential direction of the cylinder (2).

In some examples, the cylinder (2) includes a bore portion (3) in which the piston (4) reciprocates, a combustion chamber (11) fluidly coupling with the bore portion (3) and to which a discharge electrode (18) is attached, and a plurality of scavenging holes (14) configured to introduce an air-fuel mixture from the crankcase (6a) into the combustion chamber (11). The plurality of scavenging ports (14) faces each other in the radial direction of the cylinder (2).

In some examples, the fuel injector (30) includes an injection port (31) configured to spray the mixed fuel toward the second end (22). The injection port (31) is located between the plurality of scavenging holes (14) in a circumferential direction of the cylinder (2).

In some examples, the plurality of scavenging holes (14) each extend along an axial direction of the cylinder (2).

In some examples, the fuel injector (30) is located adjacent to the intake port (12) along the axial direction of the cylinder (2).

In some examples, the fuel injector (30) extends along a direction perpendicular to an axis of the cylinder (2).

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:
1. A two-stroke engine of a piston valve type comprising:
a cylinder including a bore portion and an intake port fluidly coupled with the bore portion;
a piston located in the bore portion and configured to open and close the intake port by reciprocating along an axial direction of the cylinder;
a crankcase connected to the cylinder and including a crank chamber;
a crank mechanism located in the crank chamber and configured to rotate about a crankshaft, wherein the crank mechanism includes a pair of rotating crank webs connected to the crankshaft and separated from each other in an axial direction of the crankshaft;
a connecting rod having a first end connected to the piston and a second end connected to the crank mechanism and configured to move in a circular trajectory, wherein the second end is larger than the first end; and
a fuel injector attached to the crankcase and configured to inject mixed fuel, including a combustible fuel and an oil additive, toward the second end,
wherein the cylinder includes a scavenging hole having an inlet toward the crank chamber,
wherein the fuel injector comprises an injection port that protrudes into the crank chamber and is configured to spray at least a portion of the mixed fuel toward the second end of the connecting rod, with the piston located at a top dead center, in a fuel path that is tangential to the circular trajectory of the second end,
wherein a portion of the injection port passes through a gap formed between the pair of rotating crank webs as the second end moves in the circular trajectory, and
wherein the inlet is located between the injection port and the second end of the connecting rod, with the piston located at the top dead center, when viewed from the axial direction of the crankshaft.

2. The two-stroke engine according to claim 1, wherein the inlet is located at a same height as the injection port of the fuel injector in the axial direction.

3. The two-stroke engine according to claim 1,
wherein the cylinder includes an exhaust port fluidly coupled with the bore portion and configured to be opened and closed by a reciprocating motion of the piston, and
wherein the piston is configured to close the intake port and the exhaust port when positioned at the top dead center.

4. The two-stroke engine according to claim 1, wherein the combustible fuel comprises gasoline.

5. The two-stroke engine according to claim 1,
wherein the crank mechanism includes
a crank pin connecting the pair of rotating crank webs, and
wherein the second end of the connecting rod is rotatably supported by the crank pin.

6. A two-stroke engine comprising:
a cylinder including an intake port;
a piston configured to open and close the intake port by reciprocating in the cylinder;
a crankcase connected to the cylinder and including a crank chamber;
a crank assembly located in the crank chamber and including:
a crankshaft;
a first crank web connected to the crankshaft and configured to rotate around the crankshaft; and
a second crank web connected to the crankshaft, located apart from the first crank web, and configured to rotate around the crankshaft;
a connecting rod including a first end connected to the piston and a second end connected to the crank assembly, wherein the second end is configured to move in a circular trajectory in conjunction with a reciprocating motion of the piston; and
a fuel injector attached to the crankcase and configured to spray mixed fuel, including a combustible fuel and an oil additive, toward the second end,
wherein the cylinder comprises:
a bore portion in which the piston reciprocates;
a combustion chamber fluidly coupling with the bore portion; and
a scavenging hole including an inlet directed toward the crank chamber,
wherein the fuel injector comprises an injection port that protrudes toward the second end in the crank chamber and is configured to spray the mixed fuel toward the second end of the connecting rod, with the piston located at a top dead center,
wherein a portion of the injection port passes through a gap formed between the first crank web and the second crank web as the second end moves in the circular trajectory, and
wherein the inlet is located next to the injection port in a circumferential direction of the bore portion.

7. The two-stroke engine according to claim 6,
wherein the second end is configured to move in a circular trajectory, and
wherein the injection port is configured to spray at least a portion of the mixed fuel in a fuel path that is tangential to the circular trajectory while the second end moves in the circular trajectory.

8. The two-stroke engine according to claim 6, wherein the injection port is located adjacent to the cylinder.

9. The two-stroke engine according to claim 6,
wherein the second end is configured to move in conjunction with a reciprocating motion of the piston,
wherein the injection port is configured to spray the mixed fuel in a fuel path directed toward the second end, and
wherein the injection port faces the second end when the piston is located at the top dead center.

10. The two-stroke engine according to claim 9, wherein the injection port protrudes toward the second end in the crank chamber.

11. The two-stroke engine according to claim 6, further comprising a discharge electrode which is attached to the combustion chamber,
wherein the scavenging hole is configured to introduce an air-fuel mixture from the crankcase into the combustion chamber.

12. The two-stroke engine according to claim 6, further comprising a discharge electrode which is attached to the combustion chamber,
wherein the scavenging hole is configured to introduce an air-fuel mixture from the crankcase into the combustion chamber,
wherein the cylinder includes an exhaust port fluidly coupled with the bore portion and configured to be opened and closed by a reciprocating motion of the piston, and
wherein the scavenging hole is located between the intake port and the exhaust port in a circumferential direction of the cylinder.

13. The two-stroke engine according to claim 6, wherein the fuel injector extends along a direction perpendicular to an axis of the cylinder.

14. The two-stroke engine according to claim 6, wherein the inlet is located between the injection port and the second end of the connecting rod, with the piston located at the top dead center, when viewed from an axial direction of the crankshaft.

* * * * *